United States Patent
Garbow et al.

(10) Patent No.: US 7,996,887 B2
(45) Date of Patent: Aug. 9, 2011

(54) SECURITY OF A NETWORK SYSTEM

(75) Inventors: Zachary Adam Garbow, Rochester, MN (US); Kevin W. Kirkeby, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 11/464,599

(22) Filed: Aug. 15, 2006

(65) Prior Publication Data

US 2008/0072300 A1 Mar. 20, 2008

(51) Int. Cl.
*H04L 29/00* (2006.01)
(52) U.S. Cl. ............... 726/8; 726/7; 713/182; 713/183; 713/202
(58) Field of Classification Search .............. 726/7, 8; 713/182–183, 202
See application file for complete search history.

(56) References Cited

U.S. PATENT DOCUMENTS

| | | | |
|---|---|---|---|
| 7,058,817 B1 * | 6/2006 | Ellmore | 713/183 |
| 2003/0069922 A1 * | 4/2003 | Arunachalam | 709/203 |
| 2006/0265740 A1 * | 11/2006 | Clark et al. | 726/8 |

* cited by examiner

*Primary Examiner* — Vivek Srivastava
*Assistant Examiner* — Anthony Brown
(74) *Attorney, Agent, or Firm* — Owen J. Gamon

(57) ABSTRACT

In a first aspect, a first method of improving security of a network system is provided. The first method includes the steps of (1) providing a plurality of devices coupled via a network, wherein one or more of the devices are adapted to execute at least one client and one or more of the devices are adapted to execute at least one server in a client-server relationship; and (2) employing software, functionality of which is based on client-specific criteria or operational condition criteria of the system, to reduce a number of times a user of a client of the system must provide first authentication data to access data from one or more servers of the system. Numerous other aspects are provided.

23 Claims, 2 Drawing Sheets

SECURITY OF A NETWORK SYSTEM

FIELD OF THE INVENTION

The present invention relates generally to computer systems, and more particularly to methods and apparatus for improving security of a network system.

BACKGROUND

In a conventional network system, a plurality of devices may be coupled via a network (e.g., an intranet, internet and/or the like). Software executed by some or all of the devices may establish a client-server relationship among the devices. A client refers to client software executed on a device, and a server refers to server software executed on a device. A single device may execute multiple clients and/or servers.

Using a client, a user may want to access data from one or more servers via the network. Typically, when using the client to access data from a server, the user must provide authentication data to the server. For example, when a user wants to access data from the server of the system, the client may be required to sign on (e.g., provide a username and password) to the server.

To reduce the number of times a user is asked to sign on, some conventional systems may implement single sign on functionality (SSO). When configured properly, a client employed by the user may be required to enter authentication data to access a server of the system. Thereafter, the user is not required to sign on when accessing any remaining server in the network.

SSO is configured at a server level. For example, to configure SSO, authentication data such as a lightweight third-party authentication (LTPA) key may be generated and exported to each device serving as an application server of the system. The key may indicate devices included in the system that will implement SSO.

When a user wishes to access an application on an application server, the user may type a URL on a browser executed on a client. The URL is directed to an HTTP server, which attempts to access the SSO-enabled application server. The application server will provide a token that is associated with the key to the HTTP server, which passes the token back to the browser. Thereafter, when the user navigates from the browser to another web or application server in the SSO environment, the user is not required to sign on. For example, the user may navigate from the HTTP server to another HTTP server that serves a different application server in the SSO environment. The token is provided to the other HTTP server, which provides the token to the other application server. The application server will accept the token without requiring the user to sign on.

However, because SSO employed by such conventional software and systems is employed at the server and application server level, a configuration provided thereby is coarse. More specifically, such SSO may not be configured differently for each client. For example, such conventional SSO cannot indicate when a user is required to sign on to access data and when the client is not required to sign on to access data based on the client employed. Consequently, improved SSO functionality is desired.

SUMMARY OF THE INVENTION

In a first aspect of the invention, a first method of improving security of a network system is provided. The first method includes the steps of (1) providing a plurality of devices coupled via a network, wherein one or more of the devices are adapted to execute at least one client and one or more of the devices are adapted to execute at least one server in a client-server relationship; and (2) employing software, functionality of which is based on client-specific criteria or operational condition criteria of the system, to reduce a number of times a user of a client of the system must provide first authentication data to access data from one or more servers of the system.

In a second aspect of the invention, a first apparatus for improving security of a network system is provided. The first apparatus is a network device including (1) a processor; and (2) a memory. The network device is adapted to (a) couple to a network of the system; (b) execute at least one of a client or server in a client-server relationship; and (c) employ software, functionality of which is based on client-specific criteria or operational condition criteria of the system, to reduce a number of times a user of a client of the system must provide first authentication data to access data from one or more servers of the system.

In a third aspect of the invention, a first system for providing improved security is provided. The first system is a (1) a network; and (2) a plurality of devices coupled via the network, wherein one or more of the devices are adapted to execute at least one client and one or more of the devices are adapted to execute at least one server in a client-server relationship. Each device is adapted to employ software, functionality of which is based on client-specific criteria or operational condition criteria of the system, to reduce a number of times a user of a client must provide authentication data to access data from one or more servers of the system.

In a fourth aspect of the invention, a first computer program product for improving security of a network is provided. The computer program product includes a medium readable by a computer, the computer readable medium having computer program code adapted to reduce the number of times a user of a client of a system must provide authentication data to access data from one or more servers of the system. A functionality of the computer program code is based on client-specific criteria or operational condition criteria of the system. Numerous other aspects are provided, as are systems, apparatus and computer program products in accordance with these other aspects of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION

The present invention provides methods and apparatus for improving security of a network system. More specifically, the present invention provides an improved SSO functionality. The improved SSO enables customization of sign on options at a user or client level and/or based on dynamic operational conditions or situations. Therefore, the improved SSO may be employed to provide a more customizable form of secure access within the network system compared to conventional SSO. For example, the secure access provided by the improved SSO may be based on one or more of (1) a domain, sub-domain or URL being accessed; (2) user-specific sign on rules; and (3) client-device type (e.g., cell phone, personal digital assistant (PDA), laptop computer, desktop computer and/or the like). However, the secure access provided by the improved SSO may be based on a larger or smaller amount of and/or different criteria. In this manner, the present invention provides methods and apparatus for improving security of a network system.

Figure 1:
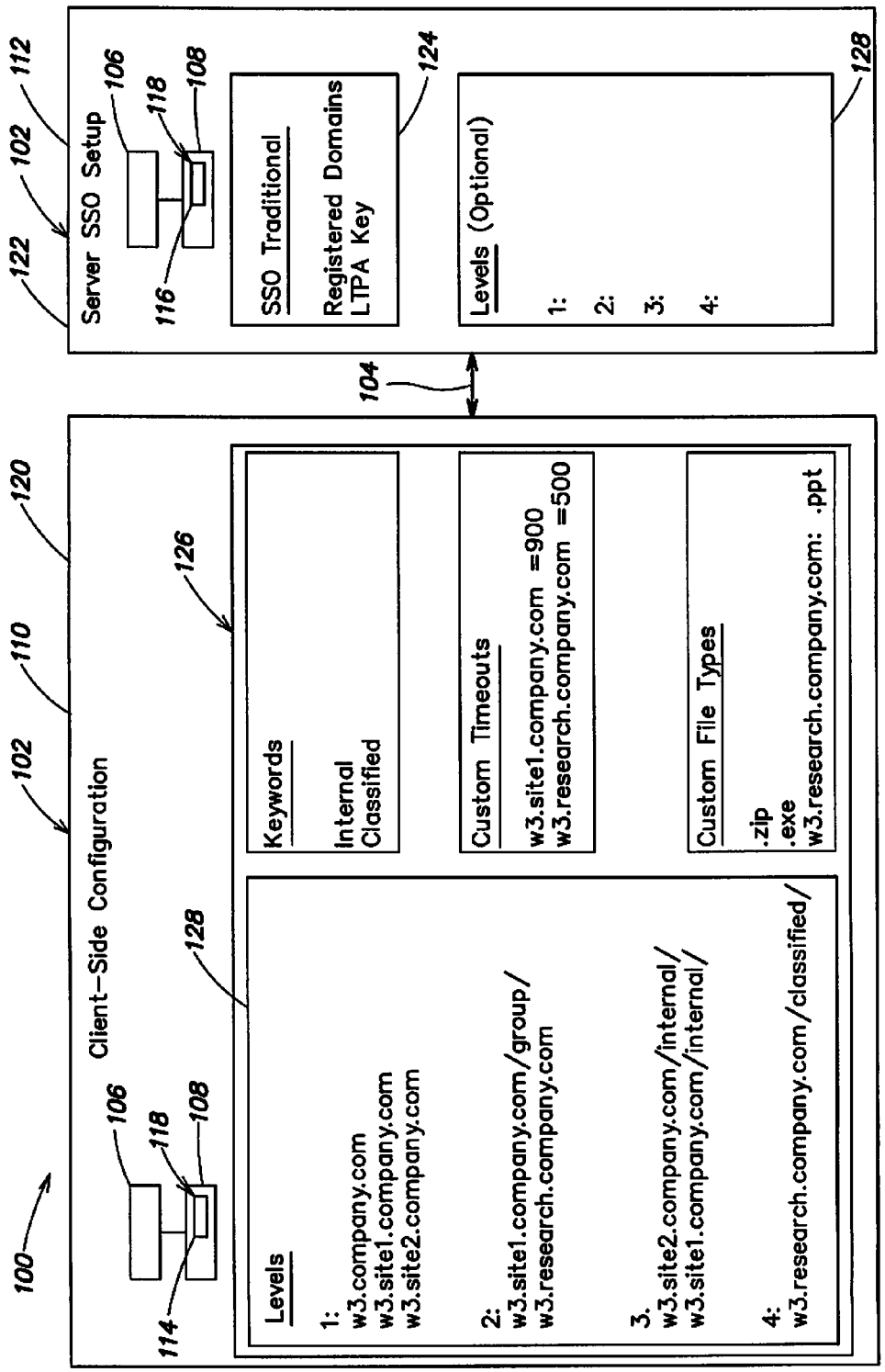
FIG. 1 illustrates a system for providing improved security in accordance with an embodiment of the present invention.

FIG. 1 illustrates a system for providing improved security in accordance with an embodiment of the present invention. With reference to FIG. 1, the system 100 may include a plurality of network devices 102 coupled via a network 104. The network 104 may employ one of many protocols and topologies known to one of skill in the art. A network device 102 may include a processor 106 coupled to a memory 108. Further, one or more of the network devices 102 may be adapted to execute at least one client 110 and one or more network devices 102 may be adapted to execute at least one server 112 in a client-server relationship (only one client 110 and one server 112 is shown). For example, one or more devices 102 may be adapted to execute a client program 114 and one or more devices 102 may be adapted to execute a server program 116 of software 118 that enables improved single sign on functionality (SSO) in the system 100. The improved SSO software 118 may be adapted to reduce the amount of times a user employing a first device 120, which may be a client, is required to provide authentication data to remaining devices 122 which execute server software in the system 100 to access data therefrom. Additionally or alternatively, the improved SSO software 118 may be adapted to ask for different types of authentication data and/or adapted to enforce tighter security controls to access data from one or more servers of the system. Authentication data may include sign on information like a username and/or password, a reduced password (e.g., smaller than the password associated with the username), an answer to a question or prompt, information that is easier to provide than the username and/or password, such as biometric and/or fingerprint identification, and/or any other sort of mechanism deemed to provide security or authentication. The improved SSO software 118 may be similar to conventional SSO software. However, the improved SSO software 118 may be configured at a user- or client-level. More specifically, the improved SSO software 118 may be customized such that functions provided by the software 118 are based on the client 110 employed to request data. Therefore, the improved SSO software 118 may be configured to indicate when a client 110 requesting data from a server 112 of the system 100 is required to provide authentication data to such server 112 based on the requesting device, the requested data, or another suitable factor. In this manner, rather than employing the improved SSO software 118 to merely define data that a client 110 may access, the improved SSO software 118 may provide customized functions based on the client 110. For example, a first device 120 which executes the client 110 of the system 100 may request and access data from one or more remaining devices 122, which execute servers 112, of the improved SSO-configured system 100. The improved SSO software 118 may enable the client 110 to access data from a server 112 without providing authentication data to such server 112. However, when requesting data from another server, the improved SSO software 118 may require the client 110 to provide authentication data to such server before the data may be accessed.

Functionality of the improved SSO software 118 may be based on client-specific criteria or operational condition criteria of the system 100. However, the improved SSO software functionality may be based on a larger or smaller amount of and/or different type of criteria. Client-specific criteria may include a plurality of unique addresses for a file (e.g., universal resource locators (URLs)), domains, sub-domains and/or the like arranged into categories based on a security level associated with each URL, domain or sub-domain, thereby forming a security hierarchy of such URLs, domains or sub-domains. For example, participating domains, sub-domains and/or URLs (e.g., domains, sub-domains and/or URLs accessible by the system 100) may be ranked or arranged into categories of security, such as "Level 1" (lowest security) through "Level 4" (highest security). For example, assume the improved SSO software 118 does not employ any other criteria. If a user employs a client 110 to sign on to and access a sub-domain included in Level 4 of the hierarchy, thereafter, the user may not have to sign on again to navigate to a sub-domain included in lower security level category. Alternatively, if the user initially signed-on to a sub-domain included in a first security level category and then navigated to a sub-domain included in a higher security level category, the improved SSO software 118 may require the user to provide authentication information. In this manner, the improved SSO software 118 may protect data or content (e.g., from a domain, sub-domain, URL, etc.) which is more sensitive than that previously accessed by a user by requiring authentication data. Further, the improved SSO software 118 may reduce the number of times a user must provide authentication data and/or the amount of authentication data that must be provided by the user when the user navigates to data which is less sensitive than that previously accessed by the user by enabling access without authentication data or with a reduced amount of authentication data. In addition, the improved SSO software 118 may require the user to provide the same or additional authentication data when the user navigates to data which is more sensitive than that previously accessed by the user since the previously-accessed, less sensitive data may have required no authentication data or a reduced amount of authentication data.

In some embodiments, values for one or more additional parameters associated with the security-level categories may be provided. Such values may determine an amount of authentication data that a user must provide to access requested data. For example, based on such parameter values, instead of requiring the user to provide full authentication data (e.g., sign on with a username and/or password) when navigating to data which is more sensitive than that previously accessed by a user, the software 118 may require the user to provide different (e.g., a reduced amount of) authentication data or answer a prompt or question (e.g., "What is your mother's maiden name?"). The different authentication data may be a reduced password, such as the last 4 digits of the user's social security number or other suitable information. Alternatively, the different authentication data may be information that is easier to provide (e.g., because it requires less effort) than the username and/or password, such as biometric and/or fingerprint identification.

Additionally or alternatively, the client-specific criteria may include one or more sign on rules. Such sign on rules may indicate when a user is required to provide authentication data to access data provided by a server 112. Sign on rules may be based on one or more of the following: a keyword, timeout, URL, directory, file type and specific file. However, the sign on rules may be based on a larger or smaller amount of and/or different factors.

A keyword may indicate terms that require a user to provide authentication data. The keyword may be associated with a particular location (e.g., site) or for the entire system 100 (e.g., data provided thereby). For example, whenever data requested by a user includes a keyword such as "confidential" or "patent", the client 110 from which the data is requested may prompt for a password. Alternatively, in some embodiments, the user may only be required to provide authentication data the first time data including such keywords is accessed. If the user accesses such data again, the software 118 will not prompt for authentication data.

A timeout may indicate an amount of time between accesses, after which a user is required to provide authentication data. The client-specific timeout value may be associated with a domain, sub-domain, URL or the like. Time between accesses may refer to the time between requests for data from the same site (e.g., provided by a server). Such site may include very confidential data, and therefore, the site may be associated with a timeout that expires quickly. Alternatively, time between accesses may refer to the time between a request for data from a first site and a subsequent request for data from a second, different site. For example, a first sub-domain (e.g., provided by a server) from which a user obtained a token (e.g., cookie) by signing-on may be associated with a timeout that is different than that associated with a second sub-domain to which the user subsequently navigates. While the user is at the second sub-domain, if the timeout associated therewith expires, the software 118 may require the user to provide authentication data again (e.g., sign on again or at least provide some type of data validating the user). In response, the server 112 providing access to the sub-domain may generate a new token and provide such to the client 110 employed by the user.

The sign on rules may include one or more URLs, each of which may have specific criteria associated therewith. Such URLs may be associated with specific domains (e.g., provided by a server) from which data is requested or all system addresses from which data may be accessed (e.g., the SSO software 118 in general). If a user requests data from such a URL (e.g., and the URL meets specific criteria associated therewith), the software 118 may require the user to provide authentication data (e.g., which validates the user's identity).

The sign on rules may include one or more directories. Such directories may be associated with specific domains from which data is requested or all system addresses from which data may be accessed. If a user requests (or accesses) data from such a directory, the software 118 may require the user to provide some type of authentication data.

The sign on rules may include one or more file types. Such file types may be associated with specific domains from which data is requested or all system addresses from which data may be accessed. If a user requests (or accesses) data (e.g., a file) having such a file type, the software 118 may require the user to provide some type of authentication data.

The sign on rules may include one or more specific file names. Such file names may be associated with specific domains from which data is requested or all system addresses from which data may be accessed. If a user requests (or accesses) such a file (e.g., from an application or an HTTP server), the software 118 may require the user to provide some type of authentication data.

In this manner, the sign on rules may provide discrete control of data access in the system 100 based on various attributes of an address (e.g., site) being accessed, thereby increasing flexibility of security provided by the software 118. The sign on rules may be provided during software configuration.

Operational condition criteria may include one or more types of devices 102 from which data is requested and/or accessed. Some types of devices 102 are not as secure as others. For example, the probability of theft of a mobile device (e.g., a cell phone, laptop or PDA) is greater than that of a stationary network device (e.g., a desktop computer located in a user's office). Once stolen, such mobile device may be used to access sensitive data provided by the system 100. Therefore, a chance of identity theft via a mobile device may be greater than that from stationary network devices. The operational condition criteria may include mobile devices. Such type of device may be associated with specific domains from which data is requested or all system addresses from which data may be accessed. If a user requests (or accesses) data via such a device type (e.g., a client 110 executed by the mobile device), the software 118 may increase system security by requiring the user to provide some type of authentication data. In some embodiments, the amount of authentication data required by the software 118 may depend on the location of the mobile device. The software 118 may employ triangulation, the global positioning system (GPS), or the like to determine the location of the mobile device. For example, if user employs a mobile device to access data from his office, the software 118 may require no authentication data or a first amount of authentication data. However, if the user employs the mobile device to access the same data while away from his office, the software 118 may require a second amount of authentication data which may be greater than the first amount. In this manner, the improved SSO software 118 may be configured using security parameters that consider the type of device requesting (or accessing) data, and therefore, consider the likelihood of physical identity theft.

In some embodiments, the improved SSO software 118 may be configured (e.g., on servers 112) similar to existing SSO software. For example, to configure the improved SSO software 118, a list of registered or participating domains may be provided to each server 112 in the system 100. Such a list may indicate domains provided by the system 100 for which the improved SSO capabilities are in effect. Further, the servers 112 may be provided authentication data, such as an LTPA key, that may be generated and exported to each device serving as an application server 112 of the system 100. The registered domain list and/or key may be stored in one or more configuration files 124 stored on each server 112.

Additionally, the improved SSO software 118 may include client-level configurations or customizations. The client-level configurations or customizations may be stored in one or more configuration files 126 (e.g., for each client 110). The one or more configuration files 126 may include the client-specific criteria and/or operational condition criteria. Such files 126 may be stored in the device 102 serving as the client 110. For example, the one or more client-level customization or configuration files 126 may include a security hierarchy 128 of addresses. The hierarchy 128 includes security Level 1 (lowest) to Level 4 (highest). Level 1 of the hierarchy 128 includes domains "w3.company.com", "w3.site1.company.com" and "w3.site2.company.com". Level 2 includes sub-domain "w3.site1.company.com/group/" and domain "w3.research.company.com", and Level 3 includes sub-domains "w3.site2.company.com/internal/" and "w3.site1.company.com/internal/". Further, Level 4 includes sub-domain "w3.research.company.com/classified/". The one or more client-level customization or configuration file 126 may include a sign on rule based on the keywords "internal" and "classified". Additionally, the one or more client-level customization or configuration files 126 may specify a sign on rule based on a timeout of 900 seconds associated with domain w3.site1.company.com and a timeout of 500 seconds associated with domain w3.research.company.com. The one or more client-level customization or configuration files 126 may also specify a sign on rule based on whether a file requested (or accessed) from any site provided by the system 100 is a compressed file (e.g., file having a ".zip" extension), an executable file (e.g., file having a ".exe" extension), or whether a file requested (or accessed) from the domain w3.research.company/com/classified/ is a Power Point file (e.g., file having a ".ppt" extension). Remaining clients 110 of the system 100 may include similar client-level customization or configuration files 126.

However, in some other embodiments, one or more portions of the files 126 storing client-level customizations or configurations may be stored as a profile on one or more of the servers 112, and used thereby. For example, the hierarchy 128 (shown in phantom) associated with a client 110 may be stored on servers 112 of the system 100. In either case, the server and client may communicate with each other to determine which side will determine and/or execute the configuration rules. Thus, if the configuration rules will be determined and executed at the client side, the client may communicate to the server that the client side profile enhancements exist and are up-to-date. In this manner, a nefarious user may be prevented from gaining unauthorized access to data.

Therefore, the one or more client-level configuration or customization files 126 may be stored on the client side or the server side. For example, the files 126 may be created and placed on the client 110 by a user thereof. Alternatively, such files 126 may be created by a system administrator for one or more of the clients 110. Such files 126 may be placed on (e.g., distributed to) corresponding clients 110 by the system administrator or via some server push or client pull technology. Such files 126 may form one or more portions of the client profile. For example, the client 110 may be a browser and the files 126, which include the client-specific profile enhancements of the present invention, may be a plug-in for the browser. The administrator may employ a software deployment tool to distribute such files 126 to the corresponding client 110, thereby updating the client profile with the SSO enhancements. A similar method may be employed to update existing client-level configuration or customization files 126 with new security information. Alternatively, a callback method in which a client 110 communicates with a server 112 may be employed to update existing client-level configuration or customization files 126 on a client 110.

However, different methods may be employed to deploy the one or more client-level configuration and customization files 126 to a client 110. For example, when a client 110 initially accesses (e.g., via an intranet or internet) a domain provided by a server 112 which is included in the SSO-enabled system 100, an applet including the files 126 may be distributed to the client 110.

When the files 126 are stored on the client side, cooperation between the client 110 and servers 112 is required to provide the dynamic user-level customization of SSO functionality. For example, when files 126 are stored on the client side (as part of a client profile), the client profile would essentially notify the server 112 whether the improved SSO software 118 is required to prompt a user of the client 110 for authentication data (e.g., a username, password and/or the like). More specifically, when client-side configuration criteria are triggered, the client 110 may communicate such occurrence to the server 112. In response, the server 112 may prompt the user for authentication data (e.g., to sign on or provide additional data if necessary).

In some embodiments, rather than storing the files 126 on a client 110, a client profile for each client 110 may be stored on the servers 112. Each client profile may include the files associated with a corresponding client 110. Therefore, such files 126 may be stored on the server side. By storing such SSO enhancements on the server side, the files 126 associated with each client 110 are not required to be distributed to the client 110. The improved SSO software 118 is adapted to provide user-level customization of SSO functionality based on files 126 stored on the servers 112.

Figure 2:
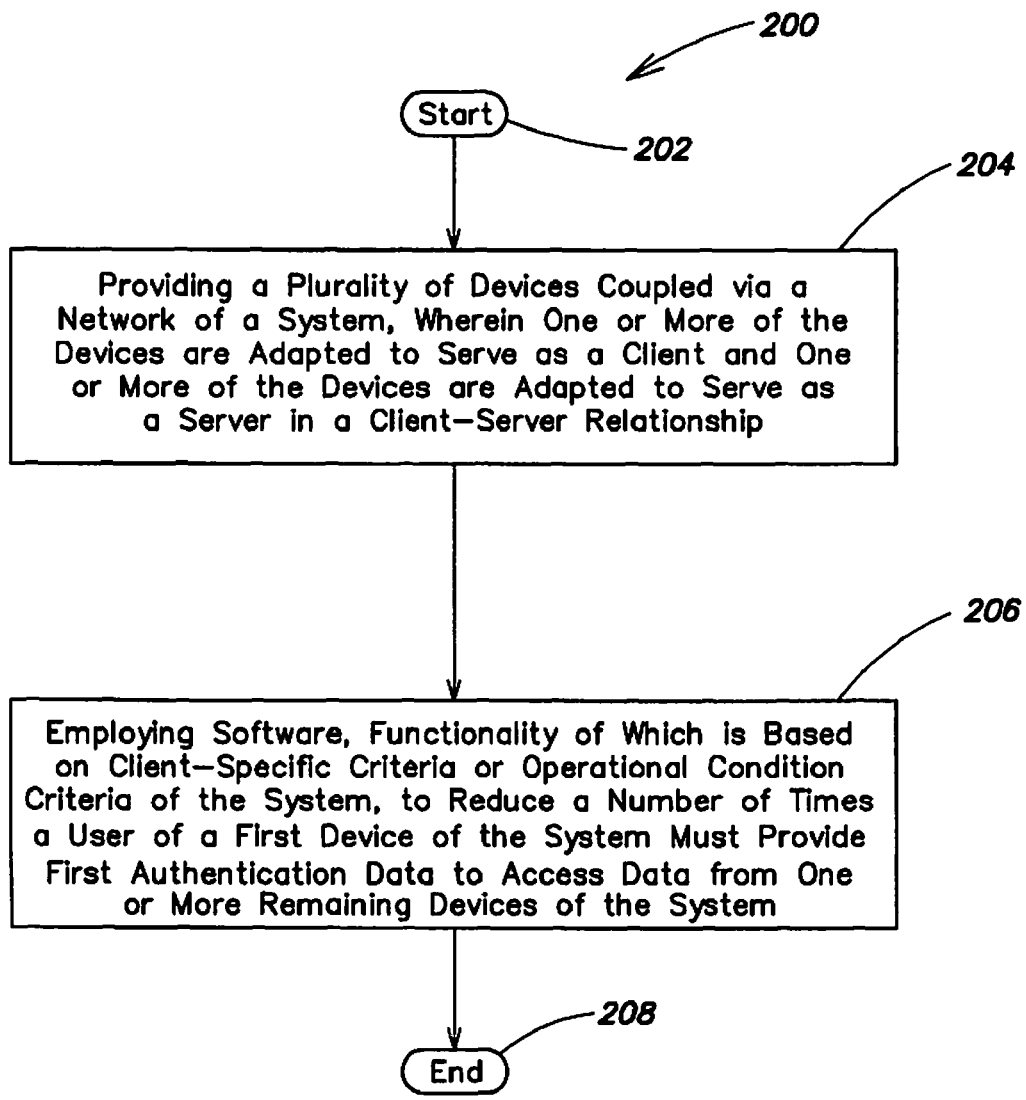
FIG. 2 illustrates a method of improving security of a network system in accordance with an embodiment of the present invention.

Operation of the system 100 for providing improved security is now described with reference to FIG. 1 and with reference to FIG. 2 which describes a method 200 of improving security of a network system in accordance with an embodiment of the present invention. With reference to FIG. 2, in step 202, the method 200 begins. In step 204, a plurality of devices 102 coupled via a network 104 is provided. One or more of the devices 102 are adapted to execute at least one client 110 and one or more of the devices 102 are adapted to execute at least one server 112 in a client-server relationship. For example, the server 112 may be a program executed by an HTTP or application server and the client 110 may be a browser executed by a device 102, such as a desktop computer, laptop computer, cell phone or PDA, from which the user may access data from the application server.

In step 206, software 118 is employed to reduce the number of times a user of a client 102 of the system 100 must provide first authentication data to access data from one or more servers 112 of the system 100. Functionality of the software 118 is based on client-specific criteria or operational condition criteria of the system 100. The improved SSO software 118 may be configured on and executed by clients 110 and/or servers 112 of the system 100. During operation, a user may employ a client 110 to request data from (or access) a Web site. Upon accessing the site, the portion of the improved SSO application executed by the client 110 may compare the site to the security configurations (e.g., the one or more client-level configuration or customization files 126) and determine whether authentication data (e.g., a sign on or other security data) is required. The client 110 may then notify the portion of the improved SSO software 118 executed by the servers 112 if the server 112 should prompt the user for authentication data before providing access to the requested data (e.g., site contents). Therefore, a user's authentication data is handled at a server level, while a determination of authentication data required to access the site's contents are handled at the client level. In this manner, the improved SSO software 118 may effectively leverage functions of existing SSO software, and provide client-level customization of SSO functionality based on dynamic situations (e.g., the type of client 110 requesting data, the actual client 110 requesting the data, the type of data requested, the actual data requested and/or the like).

Operation of the improved SSO software 118 to reduce the number of times a user of the client 110 is required to provide first authentication data to access data from one or more remaining devices 102 of the system 100 is best described by the examples below. In the system 100, the one or more client-level configuration or customization files 126 are stored on the client 110. As indicated by the configurations files 126, assume sub-domain w3.research.company.com/classified/ is extremely classified (e.g., designated security level 4). Therefore, the improved SSO software 118 may require some sort of additional security handling when a user first visits the site. For example, if a client 110 requesting access to the site does not have a token, the improved SSO software 118 may require the user of the client 110 to sign on and answer an additional security question.

Further, assume sub-domains w3.site2.company.com/internal/ and w3.site1.company.com/internal/ provide data related to government work, and such sub-domains must be designated security level of 3 to maintain the government contract. Therefore, if a client 110 requesting access to one or more of such sites already has a token (e.g., from a site with lower security level), the improved SSO software 118 may only require the user to sign on to access data from the sites.

Assume sub-domain w3.site1.company.com/group/ and domain w3.research.company.com have been designated security level 2 which does not require any additional requirements for access. Further, assume domains w3.company.com, w3.site1.company.com and w3.site2.company.com are all designated security level 1. Therefore, data from such sites may be accessed in a manner similar to that in existing SSO.

As stated, the security level hierarchy 128 may be set either on a client 110 or the servers 112. In the system 100, the hierarchy 128 is set on a client 110. By setting the security levels within the configuration profile on a client 110, the improved SSO software 118 may enable control over how an individual client's security levels are defined. Alternatively, in some embodiments a global hierarchy 128 may be set (e.g., by an administrator) on the servers 112. In this manner, the administrator may set a security level hierarchy by which all users must abide.

Further, assume sign on rules for keywords, timeouts and file types are configured as described above with reference to FIG. 1. Given the above assumption, in Exemplary Scenario #1, a user employs a client 110 to sign on to sub-domain w3.research.company.com/classified/. If a user requiring access to the sub-domain does not have an LTPA token, the user is prompted for a username or ID and/or password. Additionally, because the sub-domain is designated security level 4, the user may also be prompted to answer a security question. Thereafter, the user may access data from the site.

Thereafter, if the user navigates to the sub-domain w3.site1.company.com/group/, the software 118 will not prompt the user for any authentication information because the user is accessing data from a site (e.g., a site having security level 2) that is less secure than the previously-visited site (e.g., a site having security level 4). Thereafter, if the user navigates back to the security level 4 site one or more times, assuming no other criteria in the files 126 are triggered, the user is not required to sign on again for such subsequent accesses because the user is returning to the security level to which they originally provided authentication data.

In Exemplary Scenario #2, a user employs a client 110 to sign on to sub-domain w3.site1.company.com/group/. If a user requiring access to the sub-domain does not have an LTPA token, the user is prompted for a username or ID and/or password. Thereafter, the user may access data from the site.

Subsequently, if the user navigates to the sub-domain w3.site2.company.com/internal/ one or more times, the software 118 may only prompt the user for a password (e.g., a reduced password) during such accesses because the user is accessing data from a site having security level 3 after accessing data from a site having security level 2. The reduced password may include a smaller amount of data than the password required by the user to sign on to level 2. Alternatively, the software 118 may prompt for information that is easier to provide than the username and/or password.

Thereafter, if the user navigates to the sub-domain w3.research.company.com/classified/, although the user already has a token, the software 118 will prompt the user to answer a security question. In this manner, the improved SSO software 118 provides an additional authentication method (e.g., the security question) even when a user is already authenticated, thereby improving security of the system 100. Therefore, the improved SSO software 118 may prevent a malicious user from accessing data provided by the system 100 by using another user's authentication data. Alternatively, the improved SSO software 118 may require the user to sign on again to access the sub-domain. Thus, in some scenarios (e.g., when navigating from a first site to a more secure site), the present methods and apparatus may improve system security by increasing the number of times a user is required to provide authentication data.

Thereafter, assuming other criteria (e.g., keyword or timeout sign on rules) are not triggered, if the user navigates to a site designated with a lower security level such as the sub-domain w3.site1.company.com/group/ or the domain w3.site2.company.com, the user may not be prompted for any authentication data. In this manner, the present invention may reduce an amount of times the user may be required to sign on.

Through use of the present methods and apparatus, SSO functionality may be enabled and customized at a client or user level. Such improved SSO functionality may be based on dynamic situations and context. For example, the SSO functionality may be based on the client-specific criteria or operational condition criteria of the system 100. Therefore, a user or an administrator may leverage existing SSO functionality while providing improved system security using the client-level customization. For example, the improved SSO software 118 may be customized such that a client 110 is required to sign on based on factors such as a domain hierarchy, a URL or directory structure, file types, existence of keywords, the type of accessing device and/or the like.

The foregoing description discloses only exemplary embodiments of the invention. Modifications of the above disclosed apparatus and methods which fall within the scope of the invention will be readily apparent to those of ordinary skill in the art. For instance, the user-specific and operational condition criteria described above are exemplary. Therefore, a larger or smaller amount of and/or different type of user-specific criteria or operational condition criteria may be employed. As stated, a single network device 102 may execute multiple software clients. The network device 102 may be partitioned into several user accounts, and each client may correspond to a user account. Therefore, several users may access a Web server from that network device 102. Further, the operational condition criteria and/or client-specific criteria, such as file names, URLs, domains, sub-domains, keywords, directories, etc., may be provided using wildcards (e.g., "*", "?" and/or the like).

Accordingly, while the present invention has been disclosed in connection with exemplary embodiments thereof, it should be understood that other embodiments may fall within the spirit and scope of the invention, as defined by the following claims.

The invention claimed is:

1. A method of improving security of a network system, comprising:
    providing a plurality of devices coupled via a network, wherein one or more of the devices are adapted to execute at least one client and one or more of the devices are adapted to execute at least one server in a client-server relationship; and employing software, functionality of which is based on client-specific criteria or operational condition criteria of the system, to reduce a number of times a user of a client of the system must provide first authentication data to access data from one or more servers of the system, wherein the software is executed by the one or more of the devices that execute the at least one client, wherein the client-specific criteria is stored at the one or more of the devices, and wherein the software determines whether the first authentication data is required to access the data from the one or more servers and notifies the one or more servers whether the one or more servers should prompt the user for the first authentication data before providing access to the data, wherein the operational condition criteria comprises a location of the client that requests the data, wherein the operational condition criteria further comprises a type of the client that indicates that the client is mobile, wherein if the location comprises a first location of the client, the software requires a first amount of the first authentication data, and wherein if the location comprises a second location of the client, the software requires a second amount of the first authentication data, wherein the second amount is greater than the first amount.

2. The method of claim 1 wherein the client-specific criteria includes a plurality of URLs, domains or sub-domains arranged into categories based on a security level associated with each URL, domain or sub-domain.

3. The method of claim 1 wherein the client-specific criteria includes one or more of a keyword included in requested data, a timeout associated with a site from which data is requested, a URL from which data is requested, a directory of a server from which data is requested, a type of file that is requested and a specific file that is requested.

4. The method of claim 1, wherein the software determines the location of the client via triangulation.

5. The method of claim 4 wherein the software determines the location of the client via a global positioning system.

6. The method of claim 1 wherein employing software, functionality of which is based on client-specific criteria or operational condition criteria of the system, to reduce the number of times the user of the client of the system must provide first authentication data to access data from one or more servers of the system includes requiring the user of the client to provide the first authentication data to access data from a server of the system.

7. The method of claim 1 wherein employing software, functionality of which is based on client-specific criteria or operational condition criteria of the system, to reduce the number of times the user of the client of the system must provide first authentication data to access data from one or more servers of the system includes requiring the user of the client to provide second authentication data to access data from a server of the system, wherein the second authentication data is easier to provide than the first authentication data.

8. An apparatus for improving security of a network system, comprising:
a network device including:
a processor; and
a memory;
wherein the network device is adapted to:
couple to a network of the system;
execute at least one client or server in a client-server relationship; and
employ software, functionality of which is based on client-specific criteria or operational condition criteria of the system, to reduce a number of times a user of a client of the system must provide first authentication data to access data from one or more servers of the system, wherein the software is executed by the network device that executes the client, wherein the client-specific criteria is stored at the network device, and wherein the software determines whether the first authentication data is required to access the data from the one or more servers and notifies the one or more servers whether the one or more servers should prompt the user for the first authentication data before providing access to the data, wherein the operational condition criteria comprises a location of the client that requests the data, wherein the operational condition criteria further comprises a type of the client that indicates that the client is mobile, wherein if the location comprises a first location of the client, the software requires a first amount of the first authentication data, and wherein if the location comprises a second location of the client, the software requires a second amount of the first authentication data, wherein the second amount is greater than the first amount.

9. The apparatus of claim 8 wherein the client-specific criteria includes a plurality of URLs, domains or sub-domains arranged into categories based on a security level associated with each URL, domain or sub-domain.

10. The apparatus of claim 8 wherein the client-specific criteria includes one or more of a keyword included in requested data, a timeout associated with a site from which data is requested, a URL from which data is requested, a directory of a server from which data is requested, a type of file that is requested and one or more files that are requested.

11. The apparatus of claim 8, wherein the software determines the location of the client via triangulation.

12. The apparatus of claim 11 wherein the software determines the location of the client via a global positioning system.

13. The apparatus of claim 8 wherein the network device is further adapted to require the user of the client to provide second authentication data to access data from a server of the system, wherein the second authentication data is easier to provide than the first authentication data.

14. A system for providing improved security, comprising:
a network; and
a plurality of devices coupled via the network, wherein one or more of the devices are adapted to execute at least one client and one or more of the devices are adapted to execute at least one server in a client-server relationship;
wherein each device is adapted to employ software, functionality of which is based on client-specific criteria or operational condition criteria of the system, to reduce a number of times a user of a client must provide authentication data to access data from one or more servers of the system, wherein the software is executed by the one or more of the devices that execute the at least one client, wherein the client-specific criteria is stored at the one or more of the devices, and wherein the software determines whether the authentication data is required to access the data from the one or more servers and notifies the one or more servers whether the one or more servers should prompt the user for the authentication data before providing access to the data, wherein the operational condition criteria comprises a location of the client that requests the data, wherein the operational condition criteria further comprises a type of the client that indicates that the client is mobile, wherein if the location comprises a first location of the client, the software requires a first amount of the first authentication data, and wherein if the location comprises a second location of the client, the software requires a second amount of the first authentication data, wherein the second amount is greater than the first amount.

15. The system of claim 14 wherein the client-specific criteria includes a plurality of URLs, domains or sub-domains arranged into categories based on a security level associated with each URL, domain or sub-domain.

16. The system of claim 14 wherein the client-specific criteria includes one or more of a keyword included in requested data, a timeout associated with a site from which data is requested, a URL from which data is requested, a directory of a server from which data is requested, a type of file that is requested and one or more files that are requested.

17. The system of claim 14 wherein the software determines the location of the client via triangulation.

18. The system of claim 17 wherein the software determines the location of the client via a global positioning system.

19. The system of claim 14 wherein each network device is further adapted to require the user of the client to provide second authentication data to access data from a server of the system, wherein the second authentication data is easier to provide than the first authentication data.

20. A computer program product comprising:
a memory readable by a computer, the computer readable memory having computer program code adapted to reduce a number of times a user of a client of a system must provide first authentication data to access data from one or more servers of the system;
wherein a functionality of the computer program code is based on client-specific criteria or operational condition criteria of the system, wherein the computer program code is executed by a device that executes the client, wherein the client-specific criteria is stored at the device, and wherein the computer program code determines whether the first authentication data is required to access the data from the one or more servers and notifies the one or more servers whether the one or more servers should prompt the user for the first authentication data before providing access to the data, wherein the operational condition criteria comprises a location of the client that requests the data, wherein the operational condition criteria further comprises a type of the client that indicates that the client is mobile, wherein if the location comprises a first location of the client, the computer program code requires a first amount of the first authentication data, and wherein if the location comprises a second location of the client, the computer program code requires a second amount of the first authentication data, wherein the second amount is greater than the first amount.

21. The computer program product of claim 20 wherein the client-specific criteria includes a plurality of URLs, domains or sub-domains arranged into categories based on a security level associated with each URL, domain or sub-domain.

22. The computer program product of claim 20 wherein:
the client-specific criteria includes one or more of a keyword included in requested data, a timeout associated with a site from which data is requested, a URL from which data is requested, a directory of a server from which data is requested, a type of file that is requested and one or more files that are requested; and
wherein the computer program code determines the location of the client via a global positioning system.

23. The computer program product of claim 20 wherein the computer program code is further adapted to at least one of:
require a user of the client to provide the first authentication data to access data from a server of the system; and
employ a question or prompt to require the user of the client to provide second authentication data to access data from a server of the system, wherein the second authentication data is easier to provide than the first authentication data.

* * * * *